United States Patent [19]

Barnett et al.

[11] Patent Number: 4,846,566
[45] Date of Patent: * Jul. 11, 1989

[54] OPTICAL CABLE

[75] Inventors: Malcolm D. Barnett, Bolton; Stephen P. Driskel, Aston; John E. Taylor, Maidenhead, all of England

[73] Assignee: BICC Public Limited Company, London, England

[*] Notice: The portion of the term of this patent subsequent to Sep. 1, 2004 has been disclaimed.

[21] Appl. No.: 19,011

[22] Filed: Feb. 26, 1987

[30] Foreign Application Priority Data

Feb. 28, 1986 [GB] United Kingdom ............... 8605016

[51] Int. Cl.$^4$ ............................................. G02B 6/44
[52] U.S. Cl. .................................................. 350/96.23
[58] Field of Search ........................... 350/96.23, 96.10

[56] References Cited

U.S. PATENT DOCUMENTS

| 4,178,069 | 12/1979 | Andersen et al. | 350/96.23 |
| 4,230,898 | 10/1980 | Emmel | 350/96.23 X |
| 4,349,243 | 9/1982 | Amano et al. | 350/96.23 |
| 4,416,508 | 11/1983 | Dey et al. | 350/96.23 |
| 4,632,506 | 12/1986 | Taylor | 350/96.23 |
| 4,676,591 | 6/1987 | Driskel | 350/96.23 |
| 4,679,897 | 7/1987 | Driskel | 350/96.23 |
| 4,690,499 | 9/1987 | Taylor et al. | 350/96.23 |

FOREIGN PATENT DOCUMENTS

| 2817045 | 11/1978 | Fed. Rep. of Germany | 350/96.23 |
| 2902259 | 7/1980 | Fed. Rep. of Germany | 350/96.23 |
| 2562272 | 10/1985 | France | 350/96.23 |
| 2001182 | 1/1979 | United Kingdom | 350/96.23 |
| 2026718 | 2/1980 | United Kingdom | 350/96.23 |
| 1601004 | 10/1981 | United Kingdom | 350/96.23 |
| 2141558 | 12/1984 | United Kingdom | 350/96.23 |
| 2156094 | 10/1985 | United Kingdom | 350/96.23 |
| 2160678 | 12/1985 | United Kingdom | 350/96.23 |

Primary Examiner—Frank Gonzalez
Attorney, Agent, or Firm—Thomas R. Shaffer

[57] ABSTRACT

An optical fibre element for use in an optical cable comprises a flexbile elongate member having within and partially bounded by the elongate member throughout its length an elongate compartment; at least one optical fibre loosely housed in the elongate compartment; and means for retaining the optical fibre within the elongate compartment. The elongate member is resiliently set in such a form that the central longitudinal axis of the member follows a longitudinally extending path which, between any two longitudinally spaced positions, is greater in length than the rectilinear distance between the two positions. When the resiliently set elongate member is subjected to a longitudinally applied tensile force, the elongate member will tend to straighten in a lengthwise direction against the action of its resilient set, thereby to reduce the tensile force applied to the optical fibre. When the tensile force is removed, the elongate member will return under the action of its resilient set towards its original form. Two or more such optical fibre elements may be assembled together to form an assembly of optical fibre elements for use in an optical cable.

29 Claims, 4 Drawing Sheets

OPTICAL CABLE

BACKGROUND OF THE INVENTION

This invention relates to optical cables which are suitable for use in the communications field and which are of the kind comprising a multiplicity of optical fibres for the transmission of light having a wavelength within the range 0.8 to 2.1 micrometers and is especially, but not exclusively, concerned with an optical cable of this kind suitable for use as a local distribution cable for wide band services.

It is an object of the present invention to provide, for use in an optical cable of the aforesaid kind, an improved optical fibre element which is simple in form and inexpensive to manufacture.

SUMMARY OF THE INVENTION

According to the invention, the improved optical fibre element comprises a flexible elongate member having within and partially bounded by said elongate member throughout its length at least one elongate compartment; at least one optical fibre loosely housed in the elongate compartment or in at least one of the elongate compartments; and means for retaining the at least one optical fibre within the elongate compartment or compartments, which elongate member is resiliently set in such a form that the central longitudinal axis of the elongate member follows a longitudinally extending path which, between any two longitudinally spaced positions, is greater in length than the rectilinear distance between said two positions, the arrangement being such that, when the resiliently set elongate member is subjected to a longitudinally applied tensile force, the elongate member will tend to straighten in a lengthwise direction against the action of its resilient set, thereby to reduce the tensile force applied to the at least one optical fibre and, when the tensile force is removed, the elongate member will return under the action of its resilient set towards its original form.

Preferably, the flexible elongate member is resiliently set in such a form that its central longitudinal axis follows a path of smoothly curved undulations, the axes of curvature of the undulations preferably lying parallel to one another and substantially normal to the longitudinal axis of the elongate member. By virtue of the smoothly curved undulations, when the resiliently set elongate member is subjected to a longitudinally applied tensile force, the elongate member will tend to straighten against the action of its resilient set; that is to say, the length of the radii of the smoothly curved undulations will gradually increase. Alternatively, the flexible elongate member may be resiliently set in such a form that its central longitudinal axis follows a substantially helical path, the lay of the helically extending path preferably lying in the range 5° to 15° to the central rectilinear axis of the helically extending elongate member.

The or each optical fibre loosey housed in the or each elongate compartment in the resiliently set flexible elongate member preferably is unsupported but, in some circumstances and especially when the elongate member follows a path of smoothly curved undulations, two or more optical fibres of the optical fibre element may be component parts of at least one optical fibre ribbon structure or other optical fibre assembly loosely housed in the or an elongate compartment. In this case, the optical fibres, and if desired one or more than one flexible elongate reinforcing element, of an optical fibre ribbon structure preferably are arranged side by side and are wholly or partially embedded in a flexible elongate body of plastics material, or are arranged side by side and are secured to one major surface of a flexible tape.

In some circumstances, where the flexible elongate member follows a path of smoothly curved undulations, the or each elongate compartment preferably extends in a direction substantially parallel to the central longitudinal axis of the flexible elongate member and, where the flexible elongate member has two or more such elongate compartments, preferably, also, at least one compartment opens into one side face of the elongate member and at least one compartment opens into an opposite side face of the elongate member or all the elongate compartment is transversely spaced from the central longitudinal axis of the elongate member, the or each optical fibre and/or the or each optical fibre ribbon structure or other optical fibre assembly is of a length that is slightly greater than the length of the elongate compartment in which it is loosely housed, i.e. by an amount lying in the range 0.05 to 0.2%.

Where the flexible elongate member is resiliently set in such a form that the central longitudinal axis of the elongate member follows a substantially helical path. Preferably also the at least one optical fibre and/or the or each optical fibre ribbon structure or other optical fibre assembly is of a length that is slightly greater than the length of the elongate compartment in which it is loosely housed, e.g. by an amount lying in the range 0.05 to 0.2%.

In some circumstances, where the flexible elongate member follows a path of smoothly curved undulations, the at least one elongate compartment preferably extends in a direction substantially parallel to the central longitudinal axis of the flexible elongate member and, where the flexible elongate member has two or more such elongate compartments, preferably, also, at least one compartment opens into one side face of the elongate member and at least one compartment opens into an opposite side face of the elongate member or all the compartments open into the same side face of the elongate member.

The means for retaining the at least one optical fibre and/or the at least one optical fibre ribbon structure or other optical fibre assembly within the elongate compartment or elongate compartments of the flexible elongate member may be separately formed with respect to the elongate member, or may be integral with the elongate member. In some cases, a combination of retaining means separately formed with respect to the elongate member and retaining means integral with the elongate member may be used.

Where the retaining means is separately formed with respect to the flexible elongate member, the retaining means may comprise at least one flexible tape which is helically lapped about, or which extends longitudinally of and is transversely folded around, the elongate member to retain the at least one optical fibre and/or optical fibre ribbon structure or other optical fibre assembly within the or an elongate compartment. In another embodiment, the retaining means may comprise a separately formed elongate lid which overlies the opening of the elongate compartment, or where two or more compartments open into the same side face of the elongate member the openings of the elongate compartments, and is secured to the elongate member. The elongate lid may have on its surface nearer the surface of the elongate member into which the at least one elongate compartment opens, one or more than one longitudinally extending rib which effectively keys or key into the elongate compartment or compartments to prevent relative movement between the elongate member and the lid in a direction transverse to their longitudinal axes. To provide for ready access to the at least one optical fibre and/or optical fibre ribbon structure or other optical fibre assembly loosely housed in the at least one elongate compartment, preferably the lid is detachably secured to the flexible elongate member by any convenient means, e.g. by a snap-fit arrangement or by means of a flexible tape helically lapped about the interengaging elongate member and lid. The separately formed lid may be another flexible elongate member of substantially identical transverse cross-sectional shape and size.

Where the retaining means is integral with the flexible elongate member, preferably the elongate member has extending across the opening of the at least one elongate compartment a pair of transversely spaced resilient longitudinally extending flaps which are integral with the member and which define between their free edges a longitudinally extending slit or slot of such a width that the at least one optical fibre and/or optical fibre ribbon structure or other optical fibre assembly loosely housed in the elongate compartment cannot pass readily therethrough.

The at least one flexible elongate member is preferably of a plastics material or plastics materials which can be readily resiliently set to follow a path of the required form but it is to be understood that, in some circumstances, the at least one flexible elongate member may be of resilient metal or metal alloy. Especially suitable plastics materials of which the at least one elongate member may be made and which can be readily resiliently set include polyethylene teraphthalate and polybutylene teraphthalate.

Alternatively, the at least one flexible elongate member may be of a plastics material or plastics materials which cannot be readily resiliently set and may have embedded in the member at transversely spaced positions at least two longitudinally extending resilient elongate reinforcing elements, each of a material that is so resiliently set as to cause the member to follow said longitudinally extending path.

The invention includes an assembly of optical fibre elements as hereinbefore described which are so assembled and secured together that the central longitudinal axis of the assembly follows said longitudinally extending path.

In a specially preferred embodiment, the flexible elongate members of at least three optical fibre elements, each member having a transverse cross-section of elongate shape with the at least one elongate compartment opening into a major side of the member, are so arranged that each member except a lowermost member extends on top of and is detachably secured to another member throughout their lengths to retain in the at least one elongate compartment of said other elongate members the at least one optical fibre and/or optical fibre ribbon structure or other optical fibre assembly loosely housed therein, the assembly of flexible elongate members being resiliently set in such a form that the central longitudinal axis of the assembly follows a path of smoothly curved undulations, the axes of curvature of the undulations preferably lying parallel to one another and to the major transverse axes of the flexible elongate members of the assembly. Adjacent elongate members may be of such transverse cross-sectional shapes that the members effect a snap-fit the one with the other throughout their lengths. For example, each separately formed flexible elongate member may have in and extending throughout the length of one of its major surfaces at least two transversely spaced upstanding ribs and may have, in and extending throughout the length of the other of its major surfaces, at least two transversely spaced grooves into which the upstanding ribs of the adjacent flexible elongate member effect snap fits. The flexible elongate members preferably are all of substantially identical transverse cross-sectional shape and size.

In an alternative embodiment, two or more flexible elongate members each having a transverse cross-section of elongate shape may be arranged side by side to form an assembly in which the longitudinal axes of the elongate compartments lie in a common plane and open into a common side of the assembly, retaining means common to both or all of the elongate members, e.g. a lid or helically wound tape, being used to retain the optical fibres and/or optical fibre ribbon structures in the elongate compartments.

The invention also includes an improved optical cable comprising at least one tube in which is loosely housed at least one improved optical fibre element as hereinbefore described.

The invention further includes an improved optical cable comprising at least one tube in which is loosely housed at least one assembly of improved optical fibre elements as hereinbefore described.

The at least one tube of the improved optical cable is preferably made of a plastics electrically insulating material and, in this case, a plurality of circumferentially spaced elongate elements of reinforcing material may be embedded in the wall of the plastics tube. The elongate elements may extend helically about the axis of the plastics tube or they may extend substantially parallel to the axis of the plastics tube. Where the reinforcing elongate elements extend helically about the axis of the plastics tube, preferably at least two layers of elongate elements of reinforcing material extend helically about the axis of the tube, the directions of lay of adjacent layers being of opposite hands. The helically extending elongate elements of adjacent layers may be interwoven to form a braided sleeve of reinforcing material.

Where the elongate elements of reinforcing material extend substantially parallel to the axis of the plastics tube preferably each has, in the element, undulations, preferably radially extending undulations, that serve to improve the mechanical bonding of the element within the plastics tube and the flexibility of the optical cable.

The elongate elements of reinforcing material having undulations therein may each comprise a single wire or a plurality of wires stranded together, the wire or strand being crimped at spaced positions along its length to form undulations but, with a view to maintaining the weight of the cable as low as possible and to avoid the use of metal or metal alloy, preferably each of these elongate reinforcing elements comprises a bunch of compacted yarns of glass fibre or other inorganic reinforcing material.

Where the undulating reinforcing elements are bunches of compacted yarns of glass fibre or other inorganic reinforcing material, preferably these yarns are not pre-impregnated with an agent for binding to the plastics material of the tube and preferably, also, there is substantially no air in the interstices between the elementary filaments of the bunch. Each bunch may consist of elements of glass fibre or of other inorganic material of the same kind and/or thickness or it may consist of a combination of elements of different kinds from one another, for example single or doubled yarns, and/or of different thicknesses from one another.

The improved optical fibre element of the present invention has the very important advantage that manufacture of the at least one optical fibre and/or optical fibre ribbon structure or other optical fibre assembly and of the at least one flexible elongate member can be effected in separate operations and, when an optical fibre element of a particular construction is required, the required number of optical fibres and/or optical fibre ribbon structures or other optical fibre assemblies and flexible elongate member or members can be assembled together and resiliently set to form an improved optical fibre element as hereinbefore described. If desired, assembly and resilient setting of an improved optical fibre element and introduction of the resiliently set element into the bore of an extruded tube of plastics material can be effected in tandem.

The improved optical fibre element has the further important advantage that there is no necessity for a manufacturer to hold in stock a large number of optical fibre elements containing optical fibres differing in number from those of other elements since any particular optical fibre element can be readily formed as required.

The invention is further illustrated by a description, by way of example, of preferred forms of improved optical fibre element and of assemblies of improved optical fibre elements and of a preferred optical cable incorporating a preferred assembly of improved optical fibre elements, with reference to the accompanying diagrammatic drawings, in which:

DETAILED DESCRIPTION OF THE PREFERRED EMBODIMENTS

Figure 1:
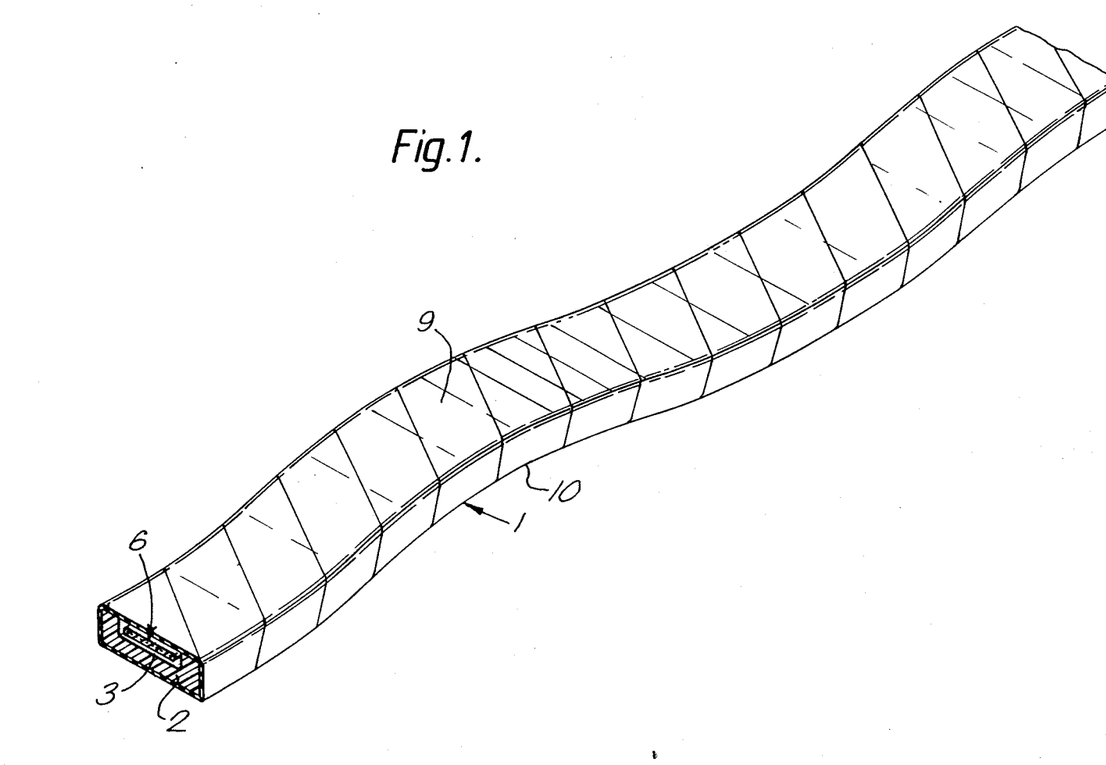
FIGS. 1 and 2 respectively, are perspective and transverse cross-sectional views, drawn on a greatly enlarged scale, of a first preferred form of optical fibre element.
Figure 2:
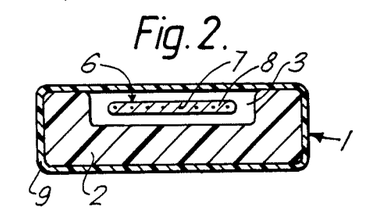

Referring to FIGS. 1 and 2, the first preferred form of optical fibre element 1 comprises a flexible elongate body 2 of extruded plastics material having a transverse cross-section of approximately U-shape, the space between the limbs of the U constituting an elongate compartment 3 which opens into one side face of the elongate member. Loosely housed in the elongate compartment 3 is an optical fibre ribbon 6 comprising a plurality of optical fibres 7 extending side by side with their axes in a substantially common plane and encapsulated in plastics material 8. The optical fibre ribbon 6 has a length approximately 0.1% greater than that of the elongate compartment 3 and is retained in the elongate compartment by a flexible tape 9 of plastics material which is helically lapped about the elongate member 2. Typically, the optical fibre element 1 has an overall width of 5.0 mm and an overall thickness of 1.5 mm. The elongate compartment 3 in the flexible elongate body 2 has a width of 2.7 mm and a depth of 0.7 mm. The optical fibre ribbon 6 has an overall width of 2.2 mm and a thickness of 0.3 mm. The flexible elongate member 2 is resiliently set in such a form that its central longitudinal axis follows a path of smoothly curved undulations 10, the axes of curvature of the undulations lying parallel to one another and substantially normal to the longitudinal axis of the elongate member. When the resiliently set elongate member 2 is subjected to a longitudinally applied tensile force, the elongate member will tend to straighten in a lengthwise direction against the action of its resilient set, thereby to reduce the tensile force applied to each optical fibre 7 and, when the the tensile force is removed, the elongate member will return under the action of its resilient set towards its original form.

Figure 3:
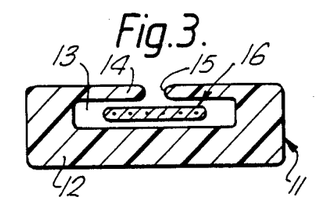
FIGS. 3, 4 and 5, respectively, are transverse cross-sectional views, drawn on a greatly enlarged scale, of a second, third and fourth preferred form of optical fibre element.

The second preferred form of optical fibre element 11 shown in FIG. 3 comprises an elongate body 12 of extruded plastics material which has extending throughout its length an elongate compartment 13 which opens into one side face of the elongate body. Loosely housed in the elongate compartment 13 is an optical fibre ribbon 16. The optical fibre ribbon 16 has a length approximately 0.1% greater than that of the elongate compartment 13 and is retained in the elongate compartment by a pair of transversely spaced resilient longitudinally extending flaps 14 which are integral with the elongate member 12 and which define between their free edges a longitudinally extending slot 15 of such a width that the optical fibre ribbon 16 loosely housed in the elongate compartment 13 cannot pass readily through the slot. As in the case of the flexible elongate member 2 of the first preferred form of optical fibre element 1 shown in FIGS. 1 and 2, the flexible elongate member 12 is resiliently set in such a form that its central longitudinal axis follows a path of smoothly curved undulations, the axes of curvature of the undulations lying parallel to one another and substantially normal to the longitudinal axis of the elongate member.

Figure 4:
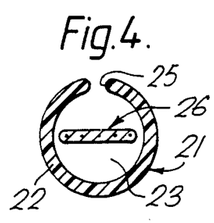

The third preferred form of optical fibre element 21 shown in FIG. 4 comprises a tube 22 of plastics material having extending throughout its length and parallel to its central longitudinal axis a continuous slot 25 opening into the bore of the tube which constitutes an elongate compartment 23. Loosely housed in the elongate compartment 23 is an optical fibre ribbon 26 which has a length approximately equal to that of the elongate compartment. The slot 25 is of such a width that the optical fibre ribbon 26 loosely housed in the elongate compartment 23 cannot pass readily through the slot. The plastics tube 22 is resiliently set in such a form that its central longitudinal axis follows a substantially helical path, the lay of the helically extending path lying at approximately 10° to the central rectilinear axis of the helically extending tube. When the resiliently set helically extending tube 22 is subjected to a longitudinally applied tensile force, the tube will tend to straighten in a lengthwise direction against the action of its resilient set, thereby to reduce the tensile force applied to each optical fibre of the optical fibre ribbon 26 and, when the tensile force is removed, the tube will return under the action of its resilient set towards its original helically extending form.

Figure 5:
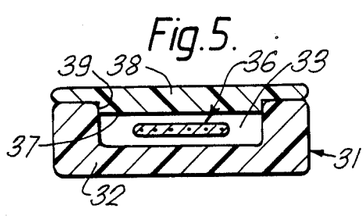

FIG. 5 shows a transverse cross-sectional view of a fourth preferred form of optical fibre element 31 comprising a flexible elongate body 32 of extruded plastics material which is substantially identical to the elongate body 2 of the optical fibre element shown in FIGS. 1 and 2. The space between the limbs of the elongate body 32 constitutes an elongate compartment 33 in which is loosely housed an optical fibre ribbon 36 which has a length approximating to that of the elongate compartment. The elongate compartment 33 opens into one side face of the elongate body 32 and is closed by a separately formed lid 38 of extruded plastics material which has extending throughout its length a rib 37 bounded by two longitudinally extending shoulders 39 which are so transversely spaced apart that the rib is a tight-fit in the elongate compartment 33. The flexible elongate member 32 with the lid 38 fitted therein is resiliently set in such a form that its central longitudinal axis follows a path of smoothly curved undulations, the axes of curvature of the undulations lying parallel to one another and substantially normal to the longitudinal axis of the elongate member.

Figure 6:
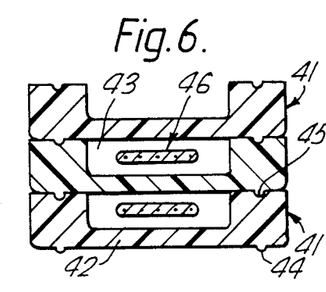
FIG. 6 is a transverse cross-sectional view, drawn on a greatly enlarged scale, of a first preferred assembly of optical fibre elements.

In the first preferred assembly of optical fibre elements shown in FIG. 6, three identical optical fibre elements 41 are assembled one on top of another to form the assembly. Each optical fibre element 41 comprises a flexible elongate member 42 of extruded plastics material having a transverse cross-section of approximately U-shape, the space between the limbs of the U constituting an elongate compartment 43 which opens into one side face of the element. In the side face of the element 42 into which the elongate compartment 43 opens on opposite sides of the compartment are two longitudinally extending transversely spaced grooves 45 and upstanding from the opposite side face of the element are two longitudinally extending transversely spaced ribs 44, the transverse spacing between the grooves and the ribs being identical. The optical fibre elements 41 are assembled together one on top of another with the longitudinally extending ribs 44 of an upper element effecting a snap-fit in the longitudinally extending grooves 45 in the immediately adjacent underlying element. As will be seen, the assembly so formed has effectively two closed elongate compartments 43 in each of which is loosely housed an optical fibre ribbon 46 having a length which is approximately 0.1% greater than that of the elongate compartment. The assembly of flexible elongate members 42 is resiliently set in such a form that the central longitudinal axis of the assembly follows a path of smoothly curved undulations, the axes of curvature of the undulations lying parallel to one another and to the major transverse axes of the flexible elongate members of the assembly.

Figure 7:
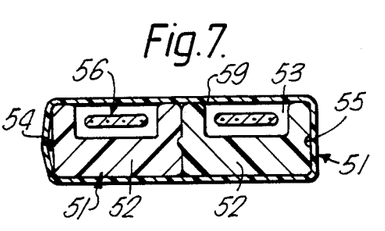
FIG. 7 is a transverse cross-sectional view, drawn on a greatly enlarged scale, of a second preferred assembly of optical fibre elements.

The second preferred assembly of optical fibre elements shown in FIG. 7 comprises two optical fibre elements 51 of identical form and each comprising a flexible elongate member 52 of extruded plastics material having a transverse cross-section of substantially U-shape, the space between the limbs of the U constituting an elongate compartment 53. The flexible elongate member 52 of each element 51 has in the side face of one of its limbs a longitudinally extending rib 54 and in the side face of the other limb a longitudinally extending groove 55, the rib and groove being so located that when the two optical fibre elements are arranged side by side, the rib of one flexible elongate member 52 effects a snap fit in the groove of the other flexible elongate member. Loosely housed in each of the elongate compartments 53 is an optical fibre ribbon 56, the ribbons being maintained in the elongate compartments by a flexible tape 59 of plastics material which is helically lapped about the two optical fibre elements. Each optical fibre ribbon 56 is approximately 0.1% greater in length than the elongate compartment 53. The assembly of flexible elongate members 52 is resiliently set in such a form that the central longitudinal axis of the assembly follows a path of smoothly curved undulations, the axes of curvature of the undulations lying parallel to one another and to the major transverse axes of the flexible elongate members of the assembly.

It will be appreciated that the flexible elongate members 42 of the optical fibre elements 41 of the assembly shown in FIG. 6 may each have a longitudinally extending rib and a longitudinally extending groove in the opposite side faces of the limbs of the U-shaped flexible elongate member so that, in addition to the optical fibre elements being assembled one on top of another, optical fibre elements may also be assembled side by side as in the assembly shown in FIG. 7.

Figure 8:
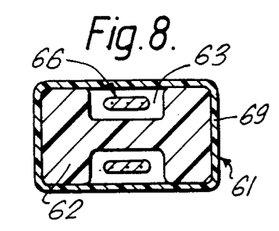
FIGS. 8 and 9, respectively, are transverse cross-sectional views, drawn on a greatly enlarged scale, of fifth and sixth preferred forms of optical fibre element.

The fifth preferred form of optical fibre element shown in FIG. 8 comprises a flexible elongate member 62 of extruded plastics material having a transverse cross-section of substantially H-shape, each of the spaces between the opposite limbs of the H-shaped member constituting an elongate compartment 63 in which is loosely housed an optical fibre ribbon 66 which is approximately 0.1% greater in length than that of the elongate compartment. The optical fibre ribbons 66 are retained in the elongate compartments 63 by a flexible tape 69 of plastics material which is helically lapped about the elongate member 62. The flexible elongate member 62 is resiliently set in such a form that its central longitudinal axis follows a path of smoothly curved undulations, the axes of curvature of the undulations lying parallel to one another and substantially normal to the longitudinal axis of the elongate member.

Figure 9:
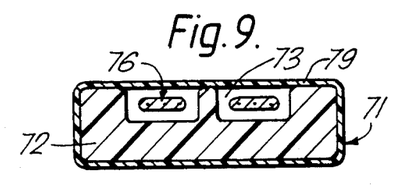

The sixth preferred form of optical fibre element shown in FIG. 9 comprises a single flexible elongate member 72 of extruded plastics material having extending throughout its length and opening into one side face of the member two transversely spaced channels, each of which constitutes an elongate compartment 73. Loosely housed in each elongate compartment 73 is an optical fibre ribbon 76 which is approximately 0.1% greater in length than that of the elongate compartment. The optical fibre ribbons 76 are retained in the elongate compartments 73 by a flexible tape 79 of plastics material which is helically lapped about the elongate member 72. The flexible elongate member 72 is resiliently set in such a form that its central longitudinal axis follows a path of smoothly curved undulations, the axes of curvature of the undulations lying parallel to one another and substantially normal to the longitudinal axis of the elongate member.

In each of the optical fibre elements shown in FIGS. 1 and 2, 3 to 5 and 8 and 9 and in each of the assemblies of optical fibre elements shown in FIGS. 6 and 7, the elongate compartment or at least one of the elongate compartments may have two or more than two optical fibre ribbons loosely housed therein.

Figure 10:
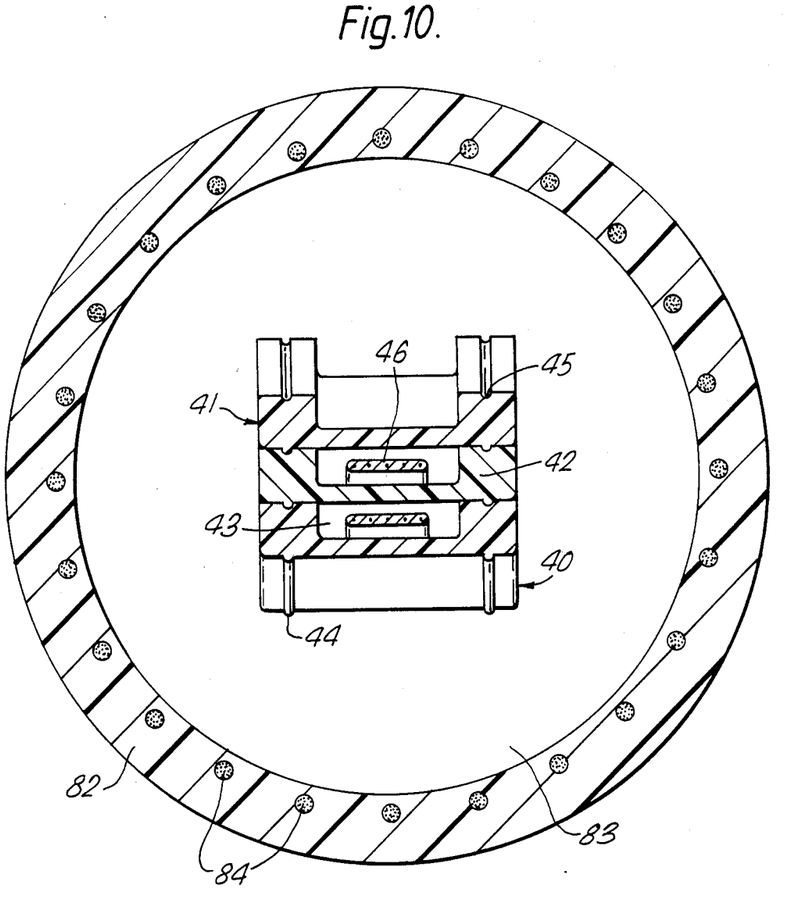
FIG. 10 is a transverse cross-sectional view, drawn on a greatly enlarged scale, of a preferred optical cable incorporating the first preferred assembly of optical fibre elements.

The preferred optical cable shown in FIG. 10 comprises a tube 82 of plastics material having a bore 83 in which is loosely housed an assembly 40 of optical fibre elements substantially as described with reference to FIG. 6. As has been explained, the assembly 40 is resiliently set in such a form that the central longitudinal axis of the assembly follows a path of smoothly curved undulations, the axes of curvature of the undulations lying parallel to one another and to the major transverse axes of the flexible elongate members 41 of the assembly. Embedded in the wall of the plastics tube 82 is a plurality of circumferentially spaced elongate elements 84 of reinforcing material which extend substantially parallel to the axis of the tube. Each reinforcing element 84 has, in the element, radially extending undulations that serve to improve the mechanical bonding of the reinforcing element within the plastics tube 82 and the flexibility of the optical cable.

It will be appreciated that, instead of the assembly 40 of optical fibre elements, any one of the optical fibre elements illustrated in FIGS. 1 and 2, 3 to 5 and 8 and 9 or the assembly of optical fibre elements illustrated in FIG. 7 can be loosely housed in the bore 83 of the plastics tube 82 of the optical cable.

Figure 11:
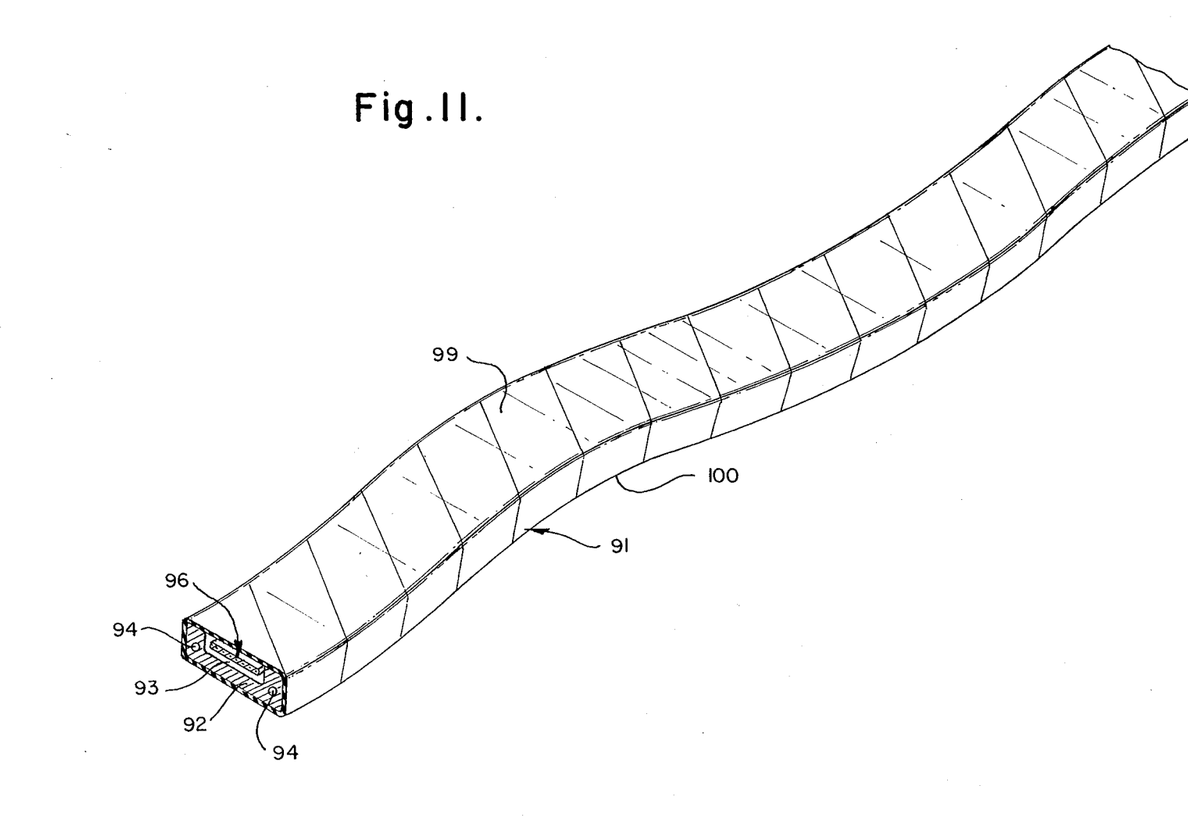
FIG. 11 is a perspective view, drawn on the greatly enlarged scale of the seventh preferred form of the optical fibre element.

The seventh preferred form of optical fibre element 21 comprises a flexible elongate body 92 of extruded plastics material having a transverse cross-section of approximately U-shape, the space between the limbs of the U constituting an elongate compartment 93 which opens into one side face of the elongate member. Embedded in the elongate member 91 at transversely spaced positions are two longitudinally extending resilient elongate reinforcing elements 94, each of which is of a material than can be readily resiliently set. Loosely housed in the elongate compartment 93 is an optical fibre ribbon 96 comprising a plurality of optical fibres extending side by side with their axes in a substantially common plane and encapsulated in plastics material. The optical fibre ribbon 96 has a length approximately 0.1% greater than that of the elongate compartment 93 and is retained in the elongate compartment by a flexible tape 99 of plastics material which is helically lapped about the elongate member 92. Typically, the optical fibre element 91 has an overall width of 5.0 mm and an overall thickness of 1.5 mm. The elongate compartment 93 in the flexible elongate member 92 has a width of 2.7 mm and a depth of 0.7 mm. The optical fibre ribbon 96 has an overall width of 2.2 mm and a thickness of 0.3 mm. Each of the longitudinally extending resilient elongate reinforcing elements 94 is resiliently set in such a form as to cause the central longitudinal axis of the elongate member 92 to follow a path of smoothly curved undulations 100, the axes of curvature of the undulations lying parallel to one another and substantially normal to the longitudinal axis of the elongate member. When the elongate member 92 with the resiliently set reinforcing elements 94 embedded therein is subjected to a longitudinally applied tensile force, the elongate member will tend to straighten in a lengthwise direction against the action of the resilient set of the reinforcing elements, thereby to reduce the tensile force applied to each optical fibre of the optical fibre ribbon 96 and, when the tensile force is removed, the elongate member will return under the action of the resilient set of the reinforcing elements towards its original form.

As has already been explained, the present invention has the very important advantage that manufacture of the optical fibres and/or optical fibre ribbons or other optical fibre assemies and of the flexible elongate members of an optical fibre element can be effected in separate operations and, when an optical fibre element of a particular construction is required, the required number of optical fibres and/or optical fibre ribbons or other optical fibre assemblies and flexible elongate member or members can be assembled together and resiliently set to form an optical fibre element or an assembly of optical fibre elements as hereinbefore described.

What we claim as our invention is:

1. An optical fibre element comprising a flexible elongate member having within and partially bounded by said elongate member throughout its length at least one elongate compartment; at least one optical fibre loosely housed in the elongate compartment; and means for retaining the at least one optical fibre within the elongate compartment, which elongate member is resiliently set in such a form that the central longitudinal axis of the elongate member follows a longitudinally extending path which, between any two longitudinally spaced positions, is greater in length than the rectilinear distance between said two positions, the arrangement being such that, when the resiliently set elongate member is subjected to a longitudinally applied tensile force, the elongate member will tend to straighten in a lengthwise direction against the action of its resilient set, thereby to reduce the tensile force applied to the at least one optical fibre and, when the tensile force is removed, the elongate member will return under the action of its resilient set towards its original form.

2. An optical fibre element as claimed in claim 1, wherein the flexible elongate member is resiliently set in such a form that its central longitudinal axis follows a substantially helical path.

3. An optical fibre element as claimed in claim 2, wherein the lay of the helically extending path of the central longitudinal axis of the resiliently set flexible elongate member lies in the range 5° to 15° to the central rectilinear axis of the helically extending elongate member.

4. An optical fibre element as claimed in claim 1, wherein the retaining means is integral with the elongate member.

5. An optical fibre element as claimed in claim 4, wherein the retaining means comprises a pair of transversely spaced resilient longitudinally extending flaps which are integral with the member and extend across the opening of each elongate compartment and which define between their free edges of a longitudinally extending slit of such a width that the at least one optical fibre loosely housed in the elongate compartment cannot pass readily therethrough.

6. An optical fibre elements as claimed in claim 1, wherein the at least one optical fibre is retained within the elongate compartment of the flexible elongate member by a combination of retaining means separately formed with respect to the elongate member and retaining means integral with the elongate member.

7. An optical fibre element as claimed in claim 1, wherein the retaining means comprises at least one flexible tape which is helically lapped about the elongate member.

8. An optical fibre element as claimed in claim 1, wherein at least two optical fibres loosely housed in the elongate compartment of the optical fibre element are component parts of at least one optical fibre ribbon structure loosely housed in the elongate compartment.

9. An optical fibre element as claimed in claim 8, wherein the optical fibres of the optical fibre ribbon structure are arranged side-by-side and are at least partially embedded in a flexible elongate body of plastics material.

10. An optical fibre element as claimed in claim 1, wherein the flexible elongate member is of a plastics material which can be readily resiliently set to follow a path of the required form.

11. An optical fibre element as claimed in claim 1, wherein the flexible elongate member is of a plastics material which cannot be readily resiliently set and wherein at least two longitudinally extending resilient elongate reinforcing elements are embedded in the member at transversely spaced positions, each reinforcing element being of a material that is so resiliently set as to cause the member to follow said longitudinally extending path.

12. An optical fibre element as claimed in claim 1, wherein the at least one optical fibre is of a length which is slightly greater than the length of the elongate compartment in which it is loosely housed.

13. An optical fibre elements as claimed in claim 12, wherein the at least one optical fibre is of a length which exceeds the length of the elongate compartment in which it is loosely housed by an amount lying in the range 0.05 to 0.2%.

14. An assembly of at least three or more optical fibre elements as claimed in claim 1, wherein the said optical fibre elements are so assembled and secured together that the central longitudinal axis of the assembly follows said longitudinal axis of the assembly follows said longitudinally extending path.

15. An assembly as claimed in claim 14, wherein the flexible elongate members of the optical fibre elements are substantially identical with one another.

16. An assembly as claimed in claim 14, wherein the optical fibre elements are so assembled and secured together that each element except one element serves as the means for retaining the at least one optical fibre within the elongate compartment of an adjacent element.

17. An assembly as claimed in claim 14, wherein adjacent flexible elongate members of said optical fibre elements are in a snap-fit engagement the one with the other.

18. An optical fibre element comprising a flexible elongate member having within and partially bounded by said elongate member throughout its length at least one elongate compartment; at least one optical fibre loosely housed in the elongate compartment; and means for retaining the at least one optical fibre within the elongate compartment, which elongate member is resiliently set in such a form that the central longitudinal axis of the elongate member follows a path of smoothly curved undulations whose axes of curvature lie parallel to one another and substantially normal to the longitudinal axis of the elongate member, the arrangement being such that, when the resiliently set elongate member is subjected to a longitudinally applied tensile force, the elongate member will tend to straighten in a lengthwise direction against the action of its resilient set, thereby to reduce the tensile force applied to the at least one optical fibre and, when the tensile force is removed, the elongate member will return under the action of its resilient set towards its original form.

19. An optical fibre element as claimed in claim 18 wherein the elongate compartment extends in a direction substantially parallel to the central longitudinal axis of the flexible elongate member.

20. An optical fibre element as claimed in claim 19, in which the flexible elongate member has at least two elongate compartments, wherein at least one compartment opens into one side face of the elongate member and at least one compartment opens into an opposite side face of the elongate member.

21. An optical fibre element as claimed in claim 19, in which the flexible elongate member has at least two elongate compartments, wherein all the compartments open into the same side face of the elongate member.

22. An optical fibre element as claimed in claim 18, wherein the retaining means comprises a separately formed elongate lid which overlies the opening of the elongate compartment and is secured to the elongate member.

23. An optical fibre element as claimed in claim 22, wherein the elongate lid has on its surface nearer the surface of the elongate member into which the elongate compartment opens, at least one longitudinally extending rib which effectively keys into the elongate compartment to prevent relative movement between the elongate member and the lid in a direction transverse to their longitudinal axes.

24. An optical fibre element as claimed in claim 22, wherein the lid is detachably secured to the flexible elongate member.

25. An optical fibre element as claimed in claim 22, wherein the separately formed elongate lid is another flexible elongate member of substantially identical transverse cross-sectional shape and size as said elongate member.

26. An optical fibre element as claimed in claim 25, wherein adjacent elongate members are of such transverse cross-sectional shapes that the members effect a snap-fit the one with the other throughout their lengths.

27. An optical cable comprising at least one tube in which is loosely housed at least one optical fibre element comprising a flexible elongate member having within and partially bounded by said elongate member throughout its length at least one elongate compartment; at least one optical fibre loosely housed in the elongate compartment; and means for retaining the optical fibre within the elongate compartment, which elongate member is resiliently set in such a form that the central longitudinal axis of the elongate member follows a longitudinally extending path which, between any two longitudinally spaced positions, is greater in length than the rectilinear distance between said two positions, the arrangement being such that, when the resiliently set elongate member is subjected to a longitudinally applied tensile force, the elongate member will tend to straighten in a lengthwise direction against the action of its resilient set, thereby to reduce the tensile force applied to the optical fibre and, when the tensile force is removed, the elongate member will return under the action of its resilient set toward its original form.

28. An optical cable as claimed in claim 27, wherein the tube is made of a plastics electrically insulating material and a plurality of circumferentially spaced elongate elements of reinforcing material are embedded in the wall of the plastics tube.

29. An optical cable comprising at least one tube in which is loosely housed at least one assembly of at least three optical fibre elements, each optical fibre element comprising a flexible elongate member having within and partially bounded by said elongate member throughout its length at least one elongate compartment; at least one optical fibre loosely housed in the elongate compartment; and means for retaining the optical fibre within the elongate compartment, each elongate member is resiliently set in such a form that the central longitudinal axis of the elongate member follows a longitudinally extending path which, between any two longitudinally spaced positions, is greater in length than the rectilinear distance between said two positions, the arrangement being such that, when the resiliently set elongate member is subjected to a longitudinally applied tensile force, the elongate member will tend to straighten in a lengthwise direction against the action of its resilient set, thereby to reduce the tensile force applied to the optical fibre and, when the tensile force is removed, the elongate member will return under the action of its resilient set towards it original form wherein the said optical fibre elements are so assembled and secured together that the central longitudinal axis of the assembly follows said longitudinally extending path.

* * * * *